(12) United States Patent
Myers et al.

(10) Patent No.: US 9,492,692 B2
(45) Date of Patent: Nov. 15, 2016

(54) ATTACHABLE ARRANGEMENT

(75) Inventors: Grant M. Myers, Pittsburgh, PA (US); Jeremy A. Steck, Pittsburgh, PA (US); Gregoire Aby-Eva, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 591 days.

(21) Appl. No.: 13/007,820

(22) Filed: Jan. 17, 2011

(65) Prior Publication Data
US 2011/0174572 A1 Jul. 21, 2011

Related U.S. Application Data

(60) Provisional application No. 61/295,892, filed on Jan. 18, 2010.

(51) Int. Cl.
A62B 35/00 (2006.01)
B64D 17/30 (2006.01)
B63C 9/11 (2006.01)

(52) U.S. Cl.
CPC .......... *A62B 35/0018* (2013.01); *A62B 35/00* (2013.01); *B63C 9/11* (2013.01); *B64D 17/30* (2013.01)

(58) Field of Classification Search
CPC .............. A62B 35/0018; A62B 35/00; A62B 35/006; A62B 35/0012; A62B 35/0025; A62B 35/0031; B64D 17/30; B63C 9/11
USPC ..................................... 182/3, 5, 6
See application file for complete search history.

(56) References Cited

U.S. PATENT DOCUMENTS

| | | | | |
|---|---|---|---|---|
| 1,939,062 A | * | 12/1933 | Knight | 244/151 R |
| 2,108,066 A | * | 2/1938 | Kuhlemann | 244/151 R |
| 3,452,374 A | * | 7/1969 | Turner | 441/89 |
| 4,563,023 A | * | 1/1986 | Clarkson | 280/748 |
| 4,632,217 A | * | 12/1986 | Markwell et al. | 182/3 |
| 4,712,513 A | | 12/1987 | Huppertsberg | |
| 4,991,689 A | * | 2/1991 | Cole | 182/3 |
| 5,203,829 A | * | 4/1993 | Fisk et al. | 119/857 |
| 5,487,444 A | * | 1/1996 | Dennington | 182/6 |
| 5,957,091 A | | 9/1999 | McDonald et al. | |
| 6,006,700 A | * | 12/1999 | Cox | 119/857 |
| 6,035,440 A | * | 3/2000 | Woodyard | 2/102 |
| 6,125,966 A | * | 10/2000 | Jones | 182/3 |
| 6,253,874 B1 | * | 7/2001 | Casebolt et al. | 182/3 |
| RE37,394 E | * | 10/2001 | Woodyard | 2/102 |
| D454,986 S | * | 3/2002 | Casebolt et al. | D29/101.1 |
| 6,405,685 B1 | * | 6/2002 | Cox | 119/857 |
| 6,645,027 B2 | * | 11/2003 | Miller | 441/88 |

(Continued)

FOREIGN PATENT DOCUMENTS

| | | |
|---|---|---|
| CH | 407761 A | 2/1966 |
| DE | 29704962 U1 | 5/1997 |
| DE | 20308897 | 8/2003 |

*Primary Examiner* — Daniel Cahn
(74) *Attorney, Agent, or Firm* — The Webb Law Firm (57) ABSTRACT

An attachable arrangement, including a plurality of straps removably attachable to a body of a user. The plurality of straps includes: at least one strap removably attachable around a first leg of the user; and at least one strap removably attachable around a second leg of the user. When attached, the at least one strap extends around the leg of the user in a direction of equal to or less than about 30° from a substantially horizontal line perpendicular to a substantially vertical axis extending down the leg of the user. A full body harness is also disclosed.

10 Claims, 7 Drawing Sheets

(56) References Cited

U.S. PATENT DOCUMENTS

| | | | |
|---|---|---|---|
| 6,804,830 B2* | 10/2004 | Reynolds et al. | 2/69 |
| 6,848,959 B2* | 2/2005 | Miller | 441/88 |
| 6,874,596 B2* | 4/2005 | Zeissler et al. | 182/3 |
| 7,025,171 B2* | 4/2006 | Cox | 182/3 |
| 7,631,728 B2* | 12/2009 | Hill et al. | 182/3 |
| 8,056,675 B2* | 11/2011 | Helms | 182/3 |
| 8,061,481 B2* | 11/2011 | Wolner et al. | 182/3 |
| 8,235,173 B2* | 8/2012 | Kopp | 182/6 |
| 8,959,664 B2* | 2/2015 | Johnson et al. | 2/44 |
| 2003/0010567 A1* | 1/2003 | Gayetty | 182/3 |
| 2003/0062218 A1* | 4/2003 | Zeissler et al. | 182/3 |
| 2005/0194211 A1* | 9/2005 | O'Shall et al. | 182/3 |
| 2005/0205356 A1* | 9/2005 | Velasco, Jr. | 182/3 |
| 2006/0048998 A1* | 3/2006 | Wolner et al. | 182/3 |
| 2007/0272484 A1* | 11/2007 | Helms | 182/3 |
| 2007/0295555 A1* | 12/2007 | O'Rourke | 182/3 |
| 2008/0060873 A1* | 3/2008 | Lang et al. | 182/3 |
| 2008/0156583 A1* | 7/2008 | Meeks | 182/9 |
| 2009/0038884 A1* | 2/2009 | Helms | 182/3 |
| 2009/0320188 A1* | 12/2009 | Johnson et al. | 2/455 |
| 2012/0228056 A1* | 9/2012 | Lang et al. | 182/3 |

* cited by examiner

ATTACHABLE ARRANGEMENT

CROSS REFERENCE TO RELATED APPLICATIONS

This application claims benefit of priority from U.S. Provisional Patent Application No. 61/295,892, filed Jan. 18, 2010, which is incorporated herein by reference in its entirety.

BACKGROUND OF THE INVENTION

Field of the Invention

The present invention relates generally to attachable arrangements, e.g., harnesses, fall protection arrangements, and the like and, in particular to an attachable arrangement including multiple straps, including one or more straps that are removably attachable around the leg of a user.

Description of the Related Art

As is known in the art, there exist various embodiments and arrangements that are attachable to a person to provide assistance to the wearer or ensure the wearer's safety in certain situations. Such attachable arrangements come in many forms, including, but not limited to, harnesses, safety belts, climbing harnesses, fall protection harnesses, safety harnesses, fall protection arrangements, etc. While there are many variations in such attachable arrangements, all normally include one or more elongate straps that are adjustable to fit different wearers. In operation, a person will don the attachable arrangement, attach the straps around the specified parts of his or her body, and adjust these straps to fit comfortably, yet effectively.

For example, full body harnesses are widely used for lifting and lowering individuals in dangerous situations and as a primary component in a personal fall arrest system. These harnesses can also be used for work positioning, travel restriction, ladder climbing, rescue retrieval, and evacuation. While these harnesses are used mainly in an industrial setting, and particularly the construction industry where the likelihood and danger of falls from heights is both numerous and significant, a full body harness can be used in various other applications in which total suspension and support of the body must be ensured, either expectedly or unexpectedly. Various harnesses are illustrated in U.S. Pat. Nos. 6,804,830; 5,957,091; and 4,712,513, all of which are incorporated herein by reference.

In a full body harness (or similar fall protection arrangement and system), two removably attachable leg loops are provided, and these leg loops are comprised of one or more straps. Such attachment, coupled with the use of a sub-pelvic strap, provides the appropriate support to the user's lower body. Further, when attached, the resulting arrangement may be referred to as a "bikini" cut based upon the positioning of the leg straps (or loops) and the contact with the user's legs and groin area. i.e., the formation of a V-shape on the front side of the arrangement. See FIG. 2.

One common drawback existing with prior art harnesses is the discomfort associated with the use of this "bikini" cut arrangement. For example, the user will often wear the leg straps of the harness incorrectly based upon these straps "riding up," again, due to the V-shape, and contact with the groin area. Therefore, it is common for many users, such as at construction sites, to wear a full body harness not properly buckled around the user's legs. This is especially common if the user is in an environment in which they feel that the risk of falling is low.

One alternative to the "bikini" cut leg strap arrangement is a "sit" harness, which is commonly used by riggers and roped-access professionals. However, one of the drawbacks associated with the use of a "sit" harness is that the leg loops do not fully open, i.e., fully detach, during the donning procedure. Accordingly, this makes donning the harness much more difficult, and requires the user to adjust the leg loops to accommodate variations in clothing from day to day. Still further, such a "sit" harness requires the user to step through the leg loops and maintain balance during this donning process.

Accordingly, there remains a need in the art of attachable arrangements, such as fall protection arrangements and systems, harnesses, safety equipment, and the like for an improved attachable arrangement. In particular, there remains a need for an attachable arrangement that provides leg straps (or loops) that are more comfortable when attached. There remains a further need in the art for an attachable arrangement that can be easily and effectively donned, such as by the user in the work environment. There also remains a need for an attachable arrangement that leads to increased safety compliance at the worksite, and provides more effective and safe support of the user in the event of a fall.

SUMMARY OF THE INVENTION

Generally, the present invention provides an attachable arrangement that overcomes some or all of the drawbacks and deficiencies existing in the prior art. Preferably, the present invention provides an attachable arrangement that leads to an easier donning process and, when donned, is more comfortable to the user as compared to the prior art attachable arrangements. Preferably, the present invention provides an attachable arrangement that leads to increased safety compliance at the worksite, and provides increased effectiveness to the fall protection arrangement and resulting safety of the user in the event of a fall.

In a preferred and non-limiting embodiment, the present invention provides an attachable arrangement, including a plurality of straps removably attachable to a body of a user. The plurality of straps includes: at least one strap removably attachable around a first leg of the user; and at least one strap removably attachable around a second leg of the user. When attached, the at least one strap extends around the leg of the user in a direction of equal to or less than about 30° from a substantially horizontal line perpendicular to a substantially vertical axis extending down the leg of the user.

In another preferred and non-limiting embodiment, the present invention provides a full body harness including a plurality of straps removably attachable to a body of a user, and including at least one strap removably attachable around a first leg of the user; and at least one strap removably attachable around a second leg of the user. When attached, the at least one strap extends around the leg of the user in a direction of equal to or less than about 30° from a substantially horizontal line perpendicular to a substantially vertical axis extending down the leg of the user.

In another preferred and non-limiting embodiment, the present invention provides a full body harness, including: a first leg strap having a first end removably attachable to a second end; a second leg strap having a first end removably attachable to a second end; a first torso strap having a first end attached to the first end of the first leg strap; a second torso strap having a first end attached to the first end of the second leg strap; and at least one torso adjustment strap having: a first end removably attachable to the second end of the second torso strap; a second end removably attachable to the second end of the first torso strap; a first intermediate portion attached to an intermediate portion of the first leg strap; and a second intermediate portion attached to an intermediate portion of the second leg strap. The angle formed at the attachment between the first torso strap and the first leg strap is in the range of about 40° to about 80°, and wherein the angle formed at the attachment between the second torso strap and the second leg strap is in the range of about 40° to about 80°.

In a further preferred and non-limiting embodiment, the present invention provides a full body harness, including: at least one sub-pelvic strap with a first end and a second end; a first torso strap having a first end and a second end, wherein the first end is attached to the first end of the at least one sub-pelvic strap; a second torso strap having a first end and a second end, wherein the first end is attached to the second end of the at least one sub-pelvic strap; a first torso adjustment strap having a first end removably attachable to the first end of the at least one sub-pelvic strap, a second end removably attachable to the second end of the second torso strap, and an intermediate portion attached to a first intermediate portion of the sub-pelvic strap; and a second torso adjustment strap having a first end removably attachable to the second end of the at least one sub-pelvic strap, a second end removably attachable to the second end of the first torso strap, and an intermediate portion attached to a second intermediate portion of the sub-pelvic strap. The angle formed at the attachment between the first torso strap and the first end of the at least one sub-pelvic strap is in the range of about 40° to about 80°, and wherein the angle formed at the attachment between the second torso strap and the second end of the at least one sub-pelvic strap is in the range of about 40° to about 80°.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. For example, the term "end" may refer to the extreme distal portion or the area near or adjacent that portion.

Figure 1:
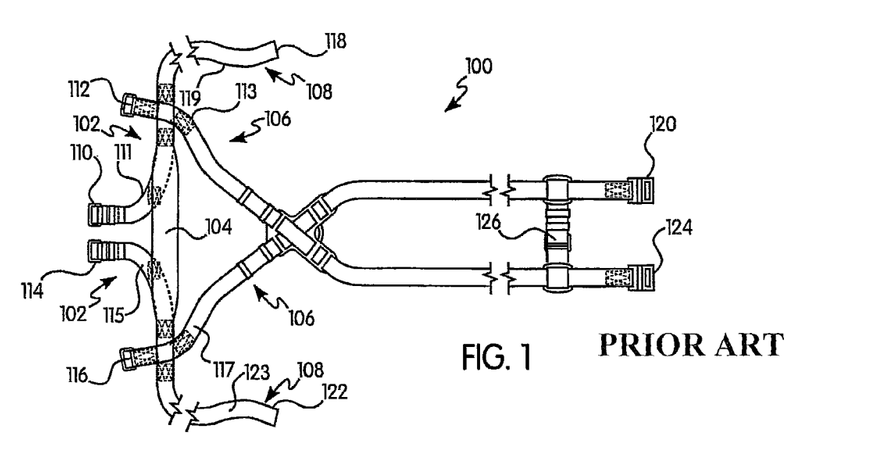
FIG. 1 is a plan view of an attachment arrangement according to the prior art.
Figure 2:
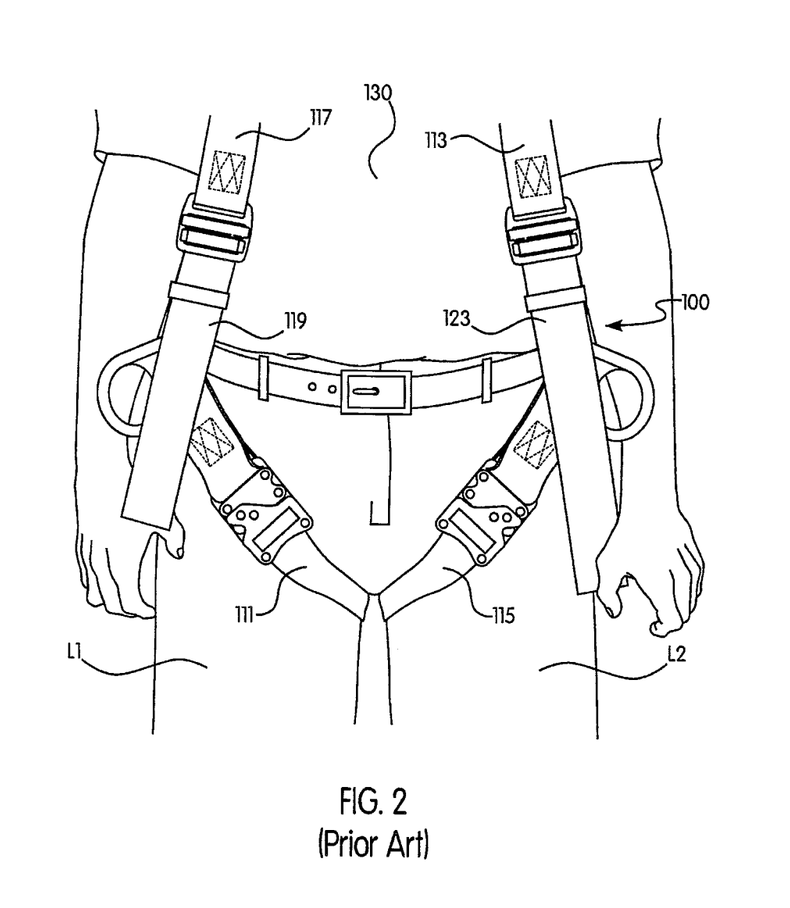
FIG. 2 is a front view of a user wearing the prior art attachment arrangement of FIG. 1.
Figure 3:
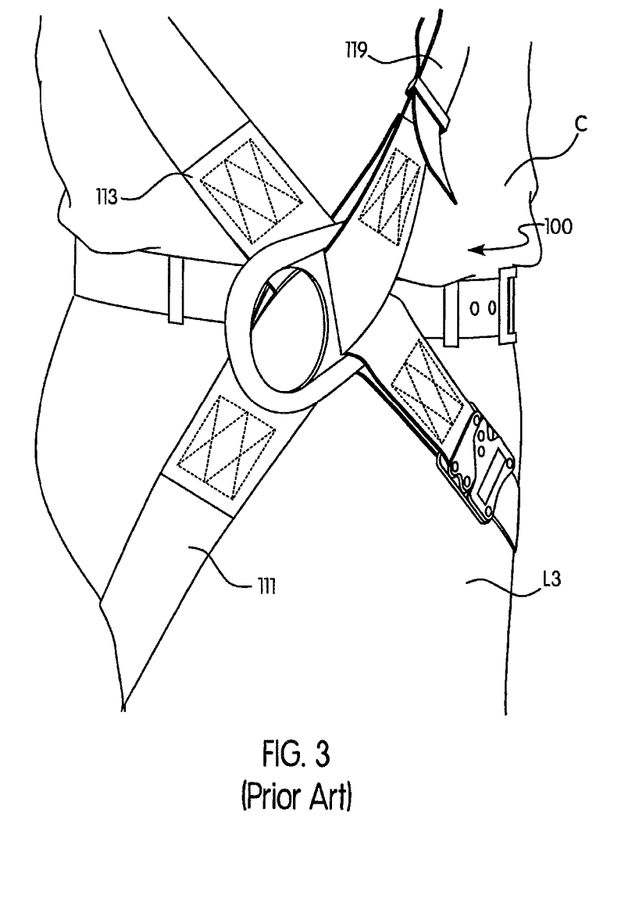
FIG. 3 is a side view of a user wearing the prior art attachment arrangement of FIG. 1.

As discussed above, and according to the existing prior art, a known attachable arrangement 100 is illustrated in FIGS. 1-3. In particular, the "bikini" cut layout and arrangement is illustrated, and this attachable arrangement 100 includes two leg straps 102 attached via a sub-pelvic strap 104. Further, each leg strap 102 is attached to a respective torso strap 106. Further, each leg strap 102 either extends and becomes, or is attached to, a respective torso adjustment strap 108.

In operation, a first end 110 of a first leg strap 111 is removably attachable to a first end 112 of a first torso strap 113. In this manner, this removably attachable arrangement loops around and encircles a user's first leg L1. Similarly, a first end 114 of a second leg strap 115 is removably attachable to a first end 116 of a second torso strap 117. Again, when attached, this structure loops around or encircles the user's leg, in this case a user's second leg L2.

Also, as is known in the art, a first end 118 of a first torso adjustment strap 119 is adjustably attached to a second end 120 of the second torso strap 117. In addition, a first end 122 of a second torso adjustment strap 123 is adjustably attached to a second end 124 of the first torso strap 113. In particular, the attachments between the torso straps 106 and the torso adjustment straps 108 allow the attachable arrangement 100 to be fitted over the user's shoulders and adjustably and removably connected. Finally, and again as is known, a chest strap 126 is attachable between the torso straps 106, thus completing the overall attachment and donning process. Further, and as noted above, in this particular "bikini" cut layout, the leg straps 111, 115 and respective torso adjustment straps 119, 123 may constitute a single piece of elongate strap or webbing material. Alternatively, this arrangement may include multiple straps attached together, such as by sewing or other substantially permanent attachment methods.

Once the attachable arrangement 100 has been donned, adjusted, and attached to the user, as illustrated in FIGS. 2 and 3, the resulting arrangement results in the above-referenced "riding up" or pinching or contacting the groin area of the user. Therefore, discomfort to the user results and the above-discussed drawbacks and deficiencies occur. Accordingly, and preferably, the present invention addresses this issue.

Figure 4:
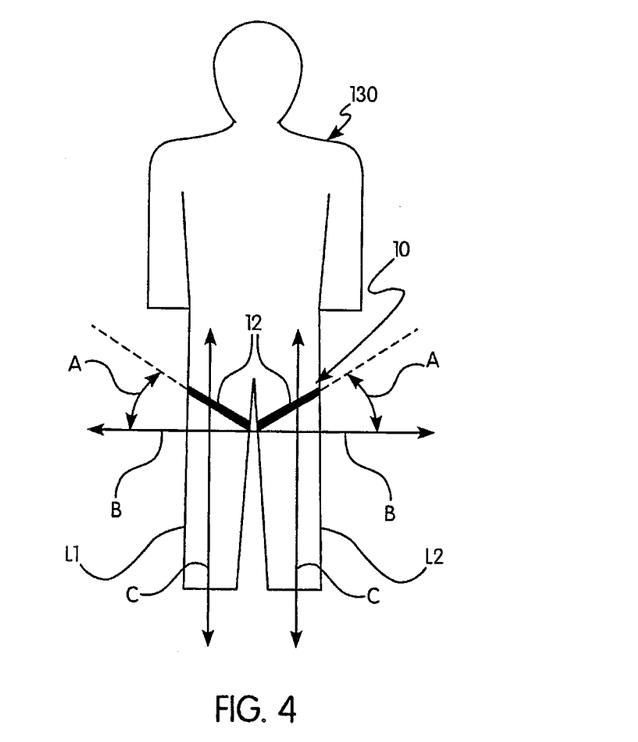
FIG. 4 is a schematic view of one embodiment of an attachable arrangement according to the principles of the present invention.
Figure 5:
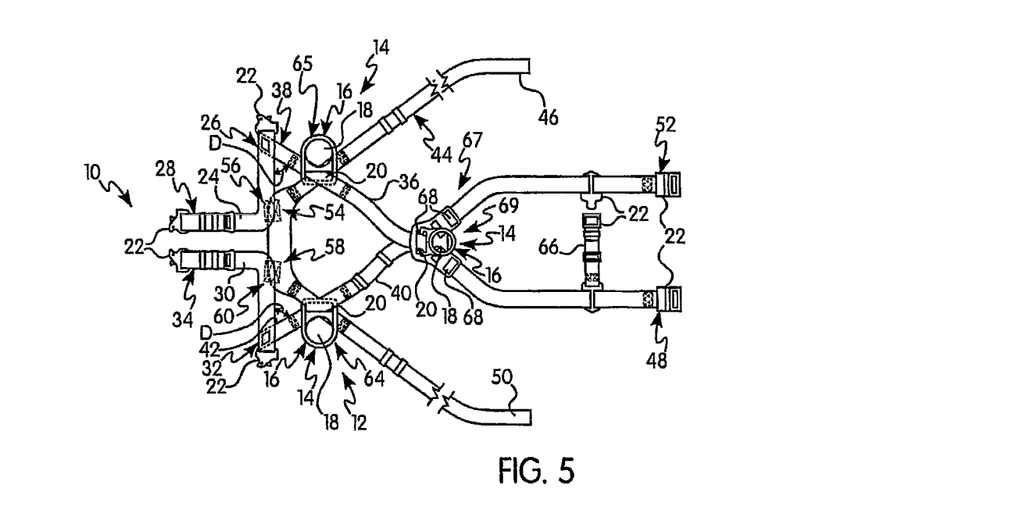
FIG. 5 is a plan view of another embodiment of an attachable arrangement according to the principles of the present invention.

The present invention is directed to an attachable arrangement 10, which includes at least one, and typically many, elongate straps 12. Various preferred and non-limiting embodiments of this attachable arrangement 10 are illustrated in FIGS. 5 and 8, and in use in FIGS. 4, 6, and 7. It is further noted that the present invention is useful in connection with a variety of attachable arrangements 10, e.g., harnesses, climbing harnesses, safety harnesses, fall protection arrangements, full body harnesses, and the like.

In one preferred and non-limiting embodiment, the attachment arrangement 10 of the present invention includes multiple straps 12 removably attachable to a user's body BO. Further, these straps include at least one strap 12 removably attachable around the first leg L1 of the user, and at least one strap 12 removably attachable around the second leg L2 of the user. When attached, the straps 12 loop around or encircle the respective leg L1, L2. Further, and with reference to FIG. 4, these leg straps 12, when attached and in operation, each strap 12 extends around the respective leg L1, L2 of the user in a direction of equal to or less than about 30° (Angle A) from a substantially horizontal line B perpendicular to a substantially vertical axis C extending down the leg L1, L2 of the user. In another preferred and non-limiting embodiment, the Angle A is equal to or less than about 20°. In a further preferred and non-limiting embodiment, the Angle A is equal to or less than about 10°, and in yet another preferred and non-limiting embodiment, the Angle A is equal to or less than about 5°. In some embodiments, the Angle A may be 0° (i.e., substantially parallel to the horizontal line B and perpendicular to the vertical axis C). Of course, it is further envisioned that the Angle A may be angled in the downward vertical direction, e.g., forming the Angle A as up to or greater than −30°. In addition, it should be recognized that the term "substantially horizontal" and "substantially vertical" are based upon the extension and orientation of a typical human leg (and may vary based upon the user).

In this manner, and based upon this modified orientation of the leg straps 12 (or the resulting loop formed by removably attaching one or more straps 12 around the respective leg L1, L2), the detrimental V-shape (i.e., strap normally extending at an angle at least 45° or more with respect to the horizontal line B) that occurs when using the "bikini" layout is avoided. Accordingly, the attachable arrangement 10 of the present invention is more comfortable to the user after donning and during use.

In order to permit attachment or securing of the attachable arrangement 10 (and, thus, the user after donning), the attachable arrangement 10 may further include one or more D-ring members 14 attached to or engaged to one or more of the straps 12 of the attachable arrangement 10. For example, the straps 12 may be looped around or otherwise permanently attached to the D-ring member 14. In particular, and as is known in the art, such a D-ring member 14 may include a frame 16 defining a central opening 18 and at least one slot 20 through which one or more of the straps 12 extend. The central opening 18 may be used to secure the clip of a lanyard or other rope or line between the attachable arrangement 10 and some secure point (or secure other items to the attachable arrangement 10). The slot 20 may be used to attach the D-ring member 14 to the attachable arrangement 10. Normally, multiple D-ring members 14 are used in connection with the attachable arrangement 10, such as on each hip area of the user and centrally located at the back of the user.

Further, and in order to attach, detach, remove, and/or adjust the attachable arrangement 10, one or more different types of attachment structures 22 may be used. For example, the attachment structure 22 may be a clip, a buckle, a mating arrangement, an actuatable structure, or the like. Unless otherwise specified, the use of the term "attach", "attachable", and/or "attachment" includes a permanent, semi-permanent, removable, or adjustable attaching arrangement. Normally, and as discussed in detail hereinafter, the preferred and non-limiting embodiments of the attachable arrangement 10 of the present invention would permit removable attachment between ends of one or more straps 12 around the legs, as well as removable attachment in the torso area of the user, with straps 12 extending over the user's shoulders. Further, it is envisioned that any such "removable" or "adjustable" attachment may also provide the user with the ability to adjust the length of the strap 12 around his or her body, legs, torso, or the like. Accordingly, various different attachment structures 22 may be used on one or both of the free ends of one or more straps 12 in order to effectively don and attach the attachable arrangement 10 to the user.

Figure 6:
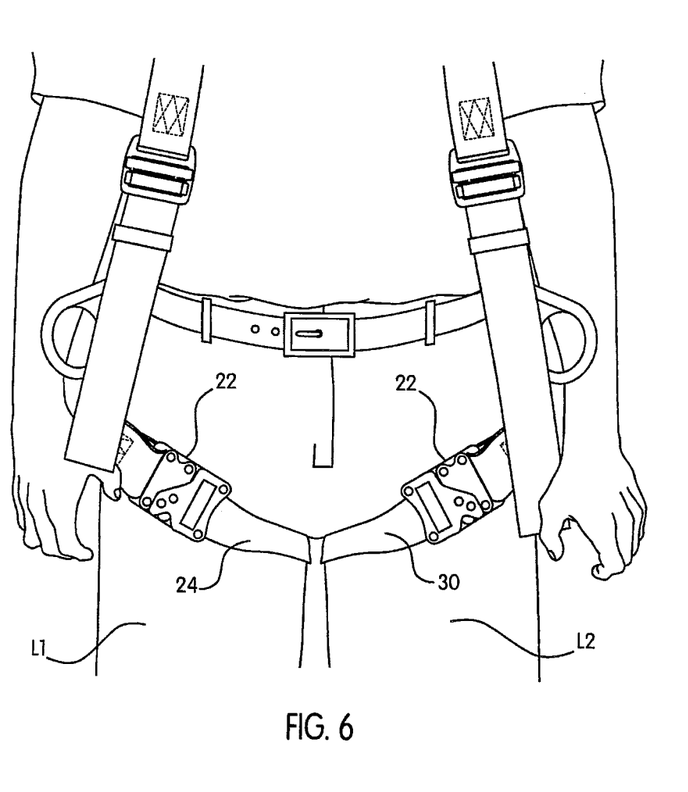
FIG. 6 is a front view of a user wearing the attachable arrangement of FIG. 4.
Figure 7:
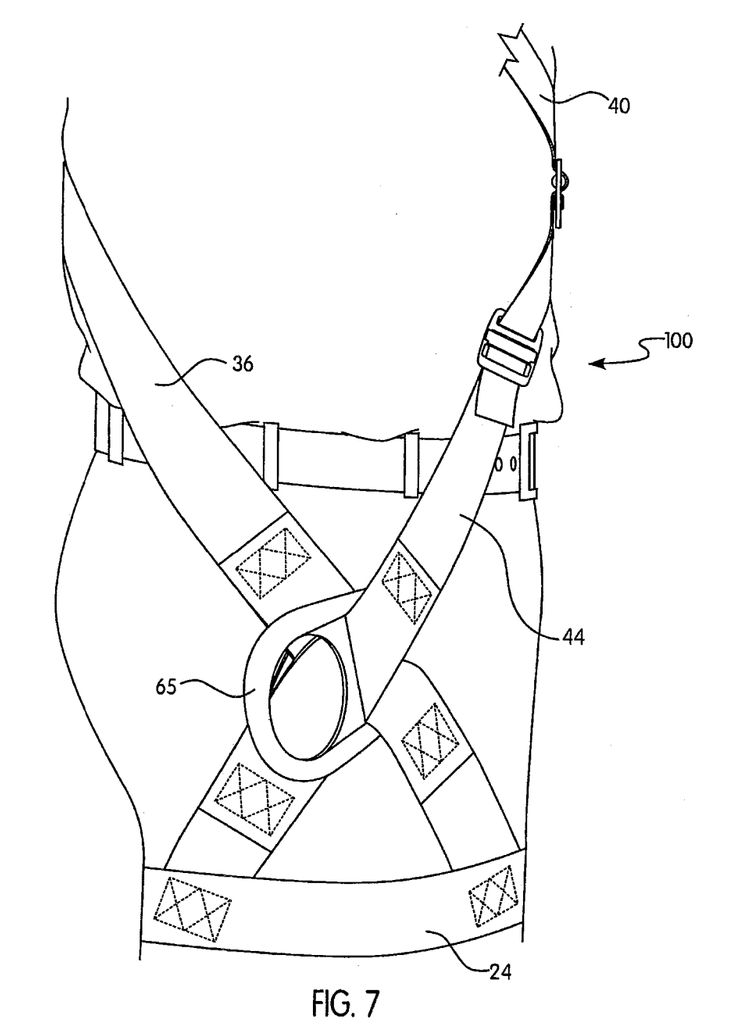
FIG. 7 is a side view of a user wearing the attachable arrangement of FIG. 4.
Figure 8:
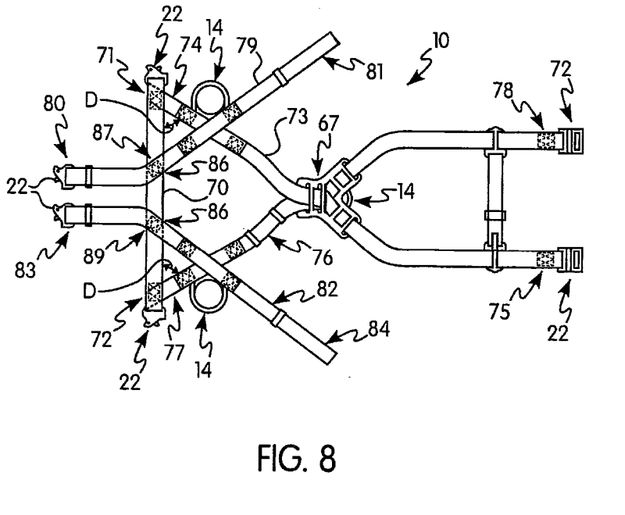
FIG. 8 is a plan view of a further embodiment of an attachable arrangement according to the principles of the present invention.

One preferred and non-limiting embodiment of the attachable arrangement 10 is illustrated in FIGS. 5-7. With specific reference to FIG. 5, and in this embodiment, the attachable arrangement 10 includes a first leg strap 24 with a first end 26 removably attachable to a second end 28, and a second leg strap 30 with a first end 32 removably attachable to a second end 34. Again, this removable attachment may be achieved by using any specified and acceptable attachment structure 22, and the arrangement may permit for adjustment. Therefore, the leg straps 24, 30 (or, indeed, any of the straps 12 in the attachable arrangement 10) may be linear lengths of material, folded straps that form loops with an attachment structure 22 at the end, folded straps with buckles or other mechanical structures to allow adjustment of the length of the strap 12, or the like.

For example, and as illustrated in FIG. 5, an attachment structure 22 is non-adjustably attached to the first end 26 of the first leg strap 24, while another attachment structure 22 is secured through the use of a loop of the material that makes up the first leg strap 24, where the first leg strap 24 is adjustable, e.g., by using the attachment structure 22 positioned at the second end 28 of the leg strap. Therefore, in such an arrangement, and with specific reference to FIG. 5, the referenced "second end" 28 of the first leg strap 24 is at or near the attachment structure 22 located after adjustment of the length of the first leg strap 24. It should be noted that this same arrangement and use of terminology is equally applicable to the other removably attachable straps 12 in the attachable arrangement 10 of the present invention, e.g., the attachment between the ends of the torso adjustment strap 44 and the torso straps 36, 40. The use of such attachment with adjustability of strap length is well known in the art.

Again, with reference to the preferred and non-limiting embodiment of FIG. 5, a first torso strap 36 has a first end 38 attached to the first end 26 of the first leg strap 24, and a second torso strap 40 includes a first end 42 attached to the first end 32 of the second leg strap 30. In this embodiment of the attachable arrangement 10, at least one torso adjustment strap 44 is provided, and this torso adjustment strap 44 includes: a first end 46 adjustably attached to a second end 52 of the second torso strap 40; a second end 50 adjustably attached to a second end 48 of the first torso strap 36; a first intermediate portion 54 attached to an intermediate portion 56 of the first leg strap 24; and a second intermediate portion 58 attached to an intermediate portion 60 of the second leg strap 30. When attached and adjusted, the Angle D formed at the attachment between the first torso strap 36 and the first leg strap 24 is in the range of about 40° to about 80°, and the Angle D formed at the attachment between the second torso strap 40 and the second leg strap 30 is in the range of about 40° to about 80°. Of course, this Angle D may be in the range of about 50° to about 70°, and in one preferred and non-limiting embodiment, the Angle D is about 60° (as illustrated in FIG. 5). It is the use and configuration of this Angle D that leads to the appropriate Angle A discussed above. See FIGS. 6 and 7.

In the embodiment of FIG. 5, multiple D-ring members 14 are used. In particular, a first D-ring member 64 (including the frame 16, central opening 18, and slot 20) is provided at the hip of the first leg L1 of the user, and the second torso strap 40 and the torso adjustment strap 44 extend through the slot 20. Further, a second D-ring member 65 is provided (and includes the frame 16, central opening 18, and slot 20), and the first torso strap 36 and the torso adjustment strap 44 extend through the slot 20. This second D-ring member 65 is provided near the hip of the user's second leg L2.

As seen in FIG. 5, the arrangement of this embodiment further includes a chest strap 66 extending between the first torso strap 36 and the second torso strap 40. This chest strap 66 may be formed of one or more straps 12, and include the appropriate attachment structures 22 and/or buckle for removable attachment and adjustment of the chest strap 66. As also illustrated in FIG. 5, the attachment arrangement 10 includes a back pad 67 having multiple slots 68 for receiving the first torso strap 36 and the second torso strap 40 therethrough for directionally guiding the torso straps 36, 40. In particular, a generally X-shape is made by the torso straps 36, 40 on the back of the user by insertion through one or more of the slots 68 of the back pad 67. Still further, and based upon the arrangement of the torso straps 36, 40 through the back pad 67, a back D-ring member 69 is secured to the attachable arrangement 10. This back D-ring member 69 includes the above-discussed frame 16, central opening 18, and slot 20, with the central opening 18 used to secure the attachable arrangement 10 to a spaced and secure point, and for use in the event of a fall.

Another preferred and non-limiting embodiment of an attachable arrangement 10 according to the present invention is illustrated in FIG. 8. In this embodiment, the plurality of straps 12 include at least one sub-pelvic strap 70 having a first end 71 and a second end 72. A first torso strap 73 has a first end 74 and a second end 75, where the first end 74 is attached to the first end 71 of the sub-pelvic strap 70. Further, a second torso strap 76 includes a first end 77 and a second end 78, and the first end 77 is attached to the second end 72 of the sub-pelvic strap 70. The Angle D formed at the attachment between the first torso strap 73 and the first end 71 of the sub-pelvic strap 70 is in the range of about 40° to about 80°, and the Angle D formed at the attachment between the second torso strap 76 and the second end 72 of the sub-pelvic strap 70 is in the range of about 40° to about 80°. As with the previously-discussed Angle D (in the embodiment of FIG. 5-7), in this preferred and non-limiting embodiment, the Angle D may preferably be in the range of about 50° to about 70°, and more preferably about 60° (as illustrated in FIG. 8). Again, it is the use and configuration of this Angle D that leads to the appropriate Angle A discussed above In addition, in this embodiment, the attachable arrangement 10 includes a first torso adjustment strap 79 with a first end 80 removably attachable to the first end 71 of the sub-pelvic strap 70, and a second end 81 adjustably attached to the second end 78 of the second torso strap 76. Similarly, the arrangement includes a second torso adjustment strap 82 with a first end 83 removably attachable to the second end 72 of the sub-pelvic strap 70, and a second end 84 adjustably attached to the second end 75 of the first torso strap 73. Still further, the first torso adjustment strap 79 includes an intermediate portion 86 attached to a first intermediate portion 87 of the sub-pelvic strap 70. Similarly, the second torso adjustment strap 82 includes an intermediate portion 88 attached to a second intermediate portion 89 of the sub-pelvic strap 70.

As with the previous embodiment, the embodiment of FIG. 8, when donned and attached, provides leg loops or straps 12 that encircle the legs L1, L2, where these straps 12 extend in any of the above-described and preferable angles (Angle A). Again, such an orientation assists in relieving any discomfort in the groin area. Further, and as discussed above, the embodiment of FIG. 8 preferably includes the necessary attachment structures 22, buckles, D-ring members 14, and back pad 67, which function as set forth above.

In this manner, the present invention provides an attachable arrangement 10 that leads to an easier donning process and, when donned and attached, is more comfortable to the user, i.e., with the leg straps not "riding up" or otherwise uncomfortably contacting the user's groin area. Further, the attachable arrangement 10 of the present invention provides an arrangement that leads to increased safety compliance at the work site, as well as improved effectiveness to the overall fall protection arrangement and resulting safety of the user in the event of a fall. In particular, and based upon the effective orientation of the leg loops of the present invention, if the user falls, the beneficial orientation of these leg loops avoid or reduce the chance of contact with the groin area.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An attachable arrangement comprising a plurality of straps configured to removably attach to a body of a user, the plurality of straps includes:

at least one first leg strap having an intermediate portion positioned between first and second ends with respect to a major longitudinal axis of the first leg strap, wherein the first and second ends of the first leg strap are configured to be removably attached to each other and configured to be free floating when detached from each other, and wherein the first leg strap is configured to removably attach around a first lea of the user;

at least one second leg strap having an intermediate portion positioned between first and second ends with respect to a major longitudinal axis of the second leg strap, wherein the first and second ends of the second leg strap are configured to be removably attached to each other and configured to be free floating when detached from each other, and wherein the second leg strap is configured to removably attach around a second leg of the user;

a first torso strap having first and second ends;

a second torso strap having first and second ends; and at least one torso adjustment strap having first and second intermediate portions positioned between first and second ends with respect to a major longitudinal axis of the torso adjustment strap;

wherein, when attached to the body of the user, a portion of the first end of the first lea strap is directly attached to the first end of the first torso strap forming an angle between the first torso strap and the first leg strap in a range of 40° to 80°, and wherein a portion of the first end of the second leg strap is directly attached to the first end of the second torso strap forming an angle between the second torso strap and the second leg strap in a range of 40° to 80°;

wherein, when attached to the body of the user, the major longitudinal axis of each of the first leg strap and the second leg strap respectively is configured to extend around a front portion of the first leg and the second lea of the user in a direction equal to or less than 30° from a direction substantially perpendicular to a longitudinal axis extending down a major length of each of the first and second legs of the user; and wherein the first intermediate portion of the torso adjustment strap is directly attached to the intermediate portion of the first leg strap, and the second intermediate portion of the torso adjustment strap is directly attached to the intermediate portion of the second lea strap.

2. The attachable arrangement of claim 1, further comprising at least one attachment structure arranged on at least one of the plurality of straps and configured to facilitate at least one of removable and adjustable attachment between at least one of the plurality of straps.

3. The attachable arrangement of claim 2, wherein the attachment structure is selected from the group consisting of the following: a clip, a buckle, a mating arrangement, and an actuatable structure.

4. The attachable arrangement of claim 1, wherein the attachable arrangement is at least one of the following: a harness, a climbing harness, a safety harness, or a fall protection arrangement.

5. The attachable arrangement of claim 1, wherein the first end of the torso adjustment strap is adjustably attached to the second end of the second torso strap, and the second end of the torso adjustment strap is adjustably attached to the second end of the first torso strap.

6. The attachable arrangement of claim 5, further comprising at least one attachment structure arranged on at least one of the plurality of straps and configured to facilitate at least one of removable and adjustable attachment between at least one of the plurality of straps.

7. The attachable arrangement of claim 6, wherein the attachment structure is selected from the group consisting of the following: a clip, a buckle, a mating arrangement, and an actuatable structure.

8. The attachable arrangement of claim 5, further comprising at least one chest strap extending between the first torso strap and the second torso strap.

9. The attachable arrangement of claim 1, wherein the angle formed between the first torso strap and the first leg strap is in a range of about 50° to about 70°, and wherein the angle formed between the second torso strap and the second leg strap is in a range of about 50° to about 70°.

10. The attachable arrangement of claim 1, wherein the angle formed between the first torso strap and the first leg strap is about 60°, and wherein the angle formed between the second torso strap and the second leg strap is about 60°.

* * * * *

UNITED STATES PATENT AND TRADEMARK OFFICE
CERTIFICATE OF CORRECTION

PATENT NO. : 9,492,692 B2  
APPLICATION NO. : 13/007820  
DATED : November 15, 2016  
INVENTOR(S) : Grant M. Myers et al.

Page 1 of 1

It is certified that error appears in the above-identified patent and that said Letters Patent is hereby corrected as shown below:

In the Claims

Column 8, Line 56, Claim 1, delete "lea" and insert -- leg --

Column 9, Line 7, Claim 1, delete "lea" and insert -- leg --

Column 9, Line 18, Claim 1, delete "lea" and insert -- leg --

Column 9, Line 27, Claim 1, delete "lea" and insert -- leg --

Signed and Sealed this  
Twenty-eighth Day of February, 2017

Michelle K. Lee  
*Director of the United States Patent and Trademark Office*